US007226667B2

(12) United States Patent
Kodama et al.

(10) Patent No.: US 7,226,667 B2
(45) Date of Patent: Jun. 5, 2007

(54) CAST-IRON INSERT AND METHOD OF MANUFACTURING SAME

(75) Inventors: Haruki Kodama, Imaichi (JP); Tomonori Fukumoto, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 258 days.

(21) Appl. No.: 10/513,964

(22) PCT Filed: May 8, 2003

(86) PCT No.: PCT/JP03/05743

§ 371 (c)(1),
(2), (4) Date: Nov. 10, 2004

(87) PCT Pub. No.: WO03/095129

PCT Pub. Date: Nov. 20, 2003

(65) Prior Publication Data

US 2005/0161187 A1 Jul. 28, 2005

(30) Foreign Application Priority Data

May 13, 2002 (JP) ............................ 2002-137548
May 13, 2002 (JP) ............................ 2002-137566

(51) Int. Cl.
*B32B 3/30* (2006.01)
*B22D 19/16* (2006.01)
*B22D 13/02* (2006.01)
*B22C 3/00* (2006.01)
*F02F 1/00* (2006.01)

(52) U.S. Cl. ...................... 428/600; 428/609; 428/653; 123/668; 123/193.2; 164/72; 164/111; 164/112; 29/888.061

(58) Field of Classification Search ..................... None
See application file for complete search history.

(56) References Cited

U.S. PATENT DOCUMENTS 3,112,541 A * 12/1963 Bohm et al. .................. 164/24
4,154,900 A * 5/1979 Kaku et al. ................. 428/554
4,576,875 A * 3/1986 Olsson et al. ............... 428/627
5,855,700 A * 1/1999 Guerard ...................... 148/522
5,957,103 A 9/1999 Takami et al.

(Continued)

FOREIGN PATENT DOCUMENTS

EP 0 532 331 A1 3/1993

(Continued)

OTHER PUBLICATIONS

Patent Abstracts of Japan, vol. 1997, No. 03, Toyota Motor Corp., Cylinder Linear to be Cast In.

(Continued)

*Primary Examiner*—John J. Zimmerman
(74) *Attorney, Agent, or Firm*—Birch, Stewart, Kolasch & Birch, LLP

(57) ABSTRACT

A cylinder liner has an outer circumferential surface around which another metal is to be cast. The cylinder liner also has a plurality of protrusions disposed on the outer circumferential surface and having respective substantially conical undercuts or necks which are progressively spread outwardly from the outer circumferential surface. The protrusions have respective flat faces on the distal ends of the undercuts.

10 Claims, 9 Drawing Sheets

U.S. PATENT DOCUMENTS

| | | | | |
|---|---|---|---|---|
| 6,123,052 | A | 9/2000 | Jahn | |
| 6,298,818 | B1 | 10/2001 | Koyama et al. | |
| 6,468,673 | B2 | 10/2002 | Saito | |
| 7,066,235 | B2 * | 6/2006 | Huang | 164/98 |
| 2001/0004498 | A1 * | 6/2001 | Saito | 428/612 |
| 2002/0157571 | A1 * | 10/2002 | Takeo et al. | 106/38.22 |
| 2003/0084567 | A1 * | 5/2003 | Dickmann et al. | 29/888.061 |

FOREIGN PATENT DOCUMENTS

| | | | | |
|---|---|---|---|---|
| EP | 0 919 715 | A2 | | 6/1999 |
| EP | 1 110 644 | A1 | | 6/2001 |
| JP | 43-4872 | A | | 2/1968 |
| JP | 50-110929 | A | | 9/1975 |
| JP | 51-89820 | A | | 8/1976 |
| JP | 53-57124 | | * | 5/1978 |
| JP | 53-75604 | A | | 6/1978 |
| JP | 53-163405 | A | | 12/1978 |
| JP | 55-19402 | A | | 2/1980 |
| JP | 55-024738 | | * | 2/1980 |
| JP | 59-054754 | | * | 3/1984 |
| JP | 60-118352 | | * | 6/1985 |
| JP | 3-000447 | A | | 1/1991 |
| JP | 6-198411 | A | | 7/1994 |
| JP | 10-122034 | A | | 5/1998 |
| JP | 3161301 | B2 | | 2/2001 |
| JP | 2001-170755 | A | | 6/2001 |
| JP | 2002-248544 | A | | 9/2002 |

OTHER PUBLICATIONS

Patent Abstracts of Japan, vol. 008, No. 061 (M-284), Honda Giken Kogyo Kabushiki Kaisha, Cylinder Block.

* cited by examiner

CAST-IRON INSERT AND METHOD OF MANUFACTURING SAME

TECHNICAL FIELD

The present invention relates to a cast-iron insert over which another metal, e.g., aluminum, is to be cast, and a method of manufacturing such a cast-iron insert.

BACKGROUND ART

For example, cylinder blocks for use in automotive engines are made of an aluminum alloy for producing lighter engines. The cylinder blocks include cast-iron cylinder sleeves or liners (inserts) to provide wear-resistant inner surfaces against which pistons slide back and forth. Brake drums for automobiles also use cast-iron shoes (inserts).

When a metal, e.g., an aluminum alloy, is to be cast around a cast-iron insert, it is necessary that the cast-iron insert and the aluminum alloy be held in intimate contact with each other and that the aluminum alloy fill surface irregularities of the cast-iron insert. To meet such requirements, Japanese laid-open patent publication No. 2001-170755 discloses a cast-iron insert having surface irregularities whose maximum height ranges from 65 μm to 260 μm and whose average interval ranges from 0.6 mm to 1.5 mm.

According to the above publication, an aluminum alloy is cast around the outer peripheral surface of the cast-iron insert by a die-casting process to obtain a product where the aluminum alloy well fills the surface irregularities of the outer peripheral surface of the cast-iron insert and the cast-iron insert is held in highly intimate contact with the aluminum alloy.

To form the desired outer surface of the cast-iron insert, there is employed a facing material in the form of a suspension which contains a mixture of 20 weight % to 45 weight % of silica sand having an average particle diameter in the range from 0.05 mm to 0.5 mm, 10 weight % to 30 weight % of silica flour having an average particle diameter of 0.1 mm or less, 2 weight % to 10 weight % of a binder, and 30 weight % to 60 weight % of water.

After the inner surface of a heated mold is coated with the above facing material, the facing material is dried. When the facing material is dried, the facing material produces a vapor through holes therein, forming countless minute recesses in the inner surface of the mold. When molten cast iron is then poured into the mold, the produced cast-iron insert has an outer surface having spines corresponding to the recesses in the inner surface of the mold.

As shown in FIG. 9 of the accompanying drawings, a cast-iron insert 1 has an outer surface 3 having needle-like spines 2. When an aluminum alloy 4 is cast around the outer surface 3 of the cast-iron insert 1, a cast product 5 is produced. Since the outer surface 3 of the cast-iron insert 1 has a plurality of spines 2, the cast aluminum alloy 4 is prevented from being relatively displaced with respect to the cast-iron insert 1 in the directions indicated by the arrow A, and is subject to reduced residual stresses.

However, the cast-iron insert 1 peels off the aluminum alloy 4 in the directions indicated by the arrow B parallel to the spines 2. When the cast-iron insert 1 peels off the aluminum alloy 4, the cast-iron insert 1 is brought out of close contact with the aluminum alloy 4, and the area of contact between the cast-iron insert 1 and the aluminum alloy 4 is reduced, thus lowering the thermal conductivity of the cast product 5.

After the cast-iron insert 1 is manufactured by casting, the inner surface (sliding surface) of the cast-iron insert 1 needs to be machined. When the inner surface of the cast-iron insert 1 is machined, the outer surface 3 of the cast-iron insert 1 is clamped by a clamp mechanism.

Because the spines 2 project from the outer surface 3 of the cast-iron insert 1, the clamp mechanism has its clamping surface held in point-to-point contact with the tip ends of the spines 2. As a result, the area of contact between the clamping surface and the cast-iron insert 1 is relatively small. On account of the relatively small area of contact between the clamping surface and the cast-iron insert 1, the cast-iron insert 1 is not positioned accurately while the inner surface of the cast-iron insert 1 is being machined. Consequently, the inner surface of the cast-iron insert 1 cannot be machined accurately.

DISCLOSURE OF THE INVENTION

It is an object of the present invention to provide a cast-iron insert which can be brought into increased intimate contact with another metal effectively by a simple process and can be clamped in position with a desired level of accuracy.

Another object of the present invention is to provide a method of manufacturing a cast-iron insert which can be brought into increased intimate contact with another metal effectively by a simple process and can maintain a desired level of thermal conductivity.

According to the present invention, a cast-iron insert around which another metal is to be cast has a surface for contact with a molten mass of the other metal to be cast around the cast-iron insert, and a plurality of protrusions disposed on the surface. The protrusions have respective substantially conical undercuts or necks which are progressively spread outwardly from the surface.

The substantially conical undercuts that progressively spread outwardly from the surface of the cast-iron insert in various different directions allow the cast-iron insert and the other metal, e.g., an aluminum alloy, cast therearound to be held in intimate contact with each other. The protrusions have a much larger surface area than the conventional spines. When the cast-iron insert is actually used, the heat generated in the cast-iron insert by another member which slides against the cast-iron insert can well be transmitted to the aluminum alloy. Accordingly, the cast-iron insert has a high heat radiation capability.

The protrusions have respective flat faces on the distal ends of the undercuts or necks which are progressively spread outwardly from the surface of the cast-iron insert. Consequently, the area of contact between the outer circumferential surface of the cast-iron insert and the clamping surface of a clamp mechanism which clamps the cast-iron insert in position is much larger than the area of contact between the outer circumferential surface of the conventional spikes and the clamping surface. Stated otherwise, while the conventional spikes and the clamping surface are held in point-to-point contact with each other, the cast-iron insert and the clamping surface are held in face-to-face contact with each other. As a result, the cast-iron insert can be clamped in position with increased accuracy and hence can be machined neatly with increased accuracy.

According to the present invention, a cast-iron insert is manufactured by coating an inner surface of a mold with a facing material containing a thermally insulating material, a binder, a parting agent, a surface active agent, and water, replacing an existing atmosphere in the mold with an inactive gas atmosphere, and rotating the mold which has been coated with the facing material and simultaneously pouring molten cast iron into the mold, to produce a cast-iron insert having a surface for contact with a molten mass of another metal to be cast around the cast-iron insert, and a plurality of protrusions disposed on the surface and having respective substantially conical undercuts or necks which are progressively spread outwardly from the surface.

Specifically, when the inner surface of the mold is coated with the facing material, part of the facing material swells outwardly into a number of spherical bulges under surface tension because of the surface active agent contained in the facing material. Therefore, the facing material is provided with the spherical bulges, each with an undercut, projecting from a facing material surface over the inner surface of the mold.

Then, the existing atmosphere in the mold is replaced with the inactive gas atmosphere. Therefore, no oxide film is formed on the surface of the molten cast iron as it is poured in the mold. As a result, the molten cast iron has its fluidity kept well in the mold. Consequently, the molten cast iron flows smoothly in the mold and reliably fills the spaces around the spherical bulges and the undercuts. When the cast iron is cooled into the cast-iron insert, it has its surface shaped accurately complementarily to the surface configuration of the facing material.

Thus, the cast-iron insert has the protrusions, each with the substantially conical undercut or neck progressively spread outwardly, firmly and neatly formed on the surface thereof. The protrusions are highly effective to keep the cast-iron insert in intimate contact with the aluminum alloy cast therearound, and also make the cast-iron insert highly thermally conductive with respect to the aluminum alloy.

The facing material contains 20 weight % to 35 weight % of diatomaceous earth as the thermally insulating material, 1 weight % to 7 weight % of bentonite as the binder, 1 weight % to 5 weight % of the parting agent, 5 ppm to 50 ppm of the surface active agent, and the remainder of water.

If the diatomaceous earth were less than 20 weight %, then the facing material would fail to be thermally insulative. If the diatomaceous earth were more than 35 weight %, then the facing material would have an increased viscosity and would become less flowable than desired. If the bentonite were less than 1 weight %, then the facing material would lose its binding ability, allowing the other constituents thereof to separate. If the bentonite were more than 7 weight %, then the facing material would become too viscous to disintegrate after the cast-iron insert has been cast to shape.

If the parting agent were less than 1 weigh %, then the facing material would lose its parting ability. If the parting agent were more than 5 weight %, then water contained in the parting agent would be turned into a gas due to the heat of the molten cast iron, producing blow holes in the cast-iron insert.

If the surface active agent were less than 5 ppm, then it would fail to keep the bulges spherical in shape. If the surface active agent were more than 50 ppm, then the facing material would be foamed.

The mold is rotated at a mold G No. ranging from 25 G to 35 G when the inner surface of the mold is coated with the facing material. If the mold G No. were less than 25 G, then the spherical bulges would not be deformed sufficiently, resulting in an unduly wide interval between adjacent ones of the spherical bulges. The unduly widely spaced spherical bulges would fail to give desired undercuts to the protrusions of the cast-iron insert, which would then not be able to adhere firmly to the aluminum alloy. If the mold G No. were more than 35 G, then the spherical bulges would be deformed excessively, resulting in an unduly narrow interval between adjacent ones of the spherical bulges. The unduly narrowly spaced spherical bulges would reduce the diameter of the necks of the protrusions of the cast-iron insert, which would then be liable to be broken off.

The mold G No. is represented by (the centrifugal acceleration of the mold/the gravitational acceleration). If the mold G No. is expressed using the diameter D (cm) of the cylindrical mold and the rotational speed N (rpm) of the mold, then the mold G No. is equal to $DN^2/17900$ (see Japanese laid-open patent publication No. 2002-283025 for details). Therefore, the mold G No. can be obtained from the diameter D and the rotational speed N.

BEST MODE FOR CARRYING OUT THE INVENTION

Figure 1:
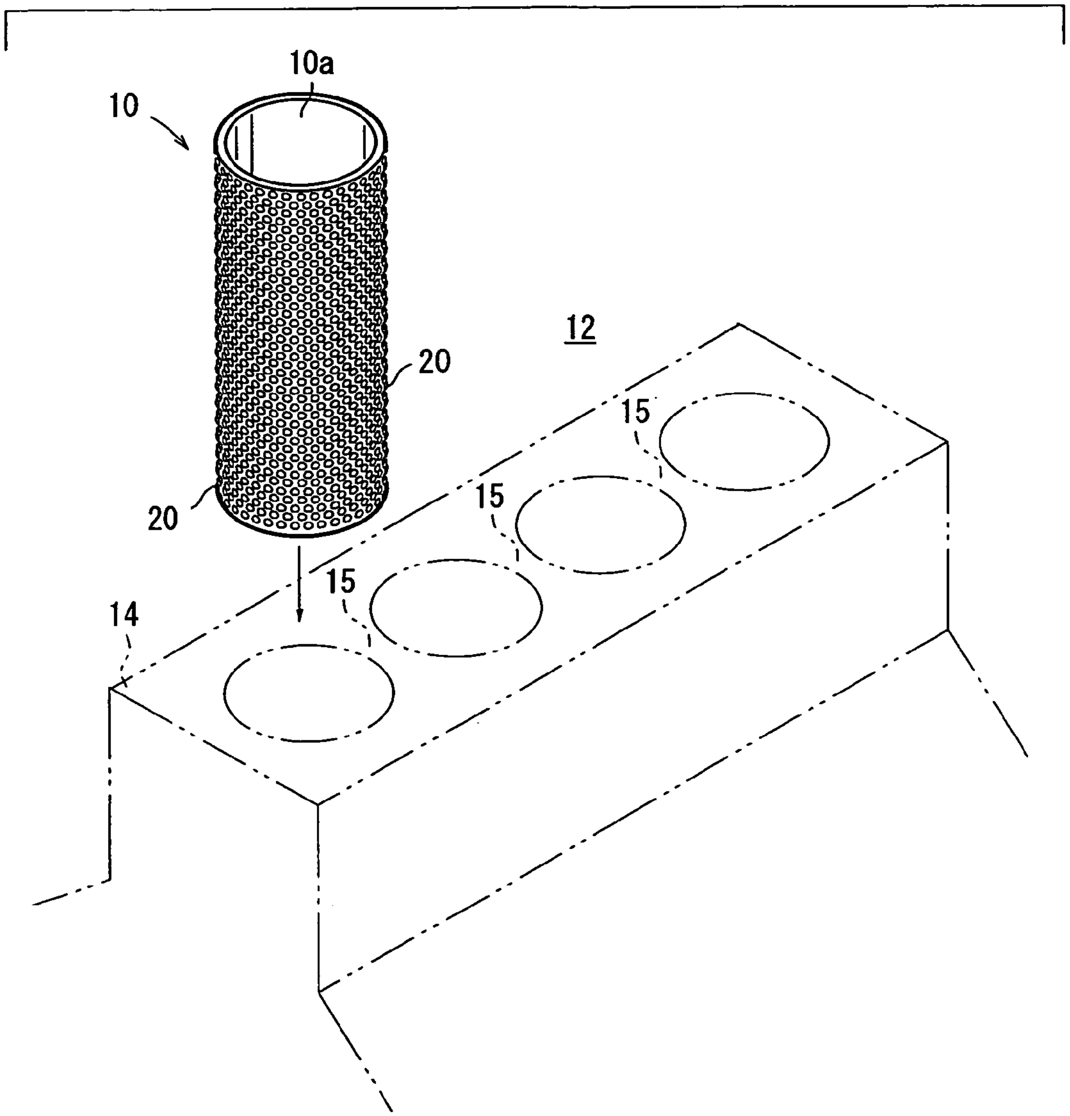
FIG. 1 is an exploded perspective view of a cylinder block to be cast around a cylinder liner as a cast-iron insert according to an embodiment of the present invention.

FIG. 1 shows in exploded perspective a cylinder block 12 to be cast around a cylinder liner or sleeve 10 as a cast-iron insert according to the present invention.

As shown in FIG. 1, the cylinder block 12 includes a block 14 made of an aluminum alloy, for example, to produce lighter engines. The cylinder block 12 also includes a plurality of cylinder liners or sleeves 10 (one shown) around which an aluminum alloy is cast as the block 14.

Figure 2:
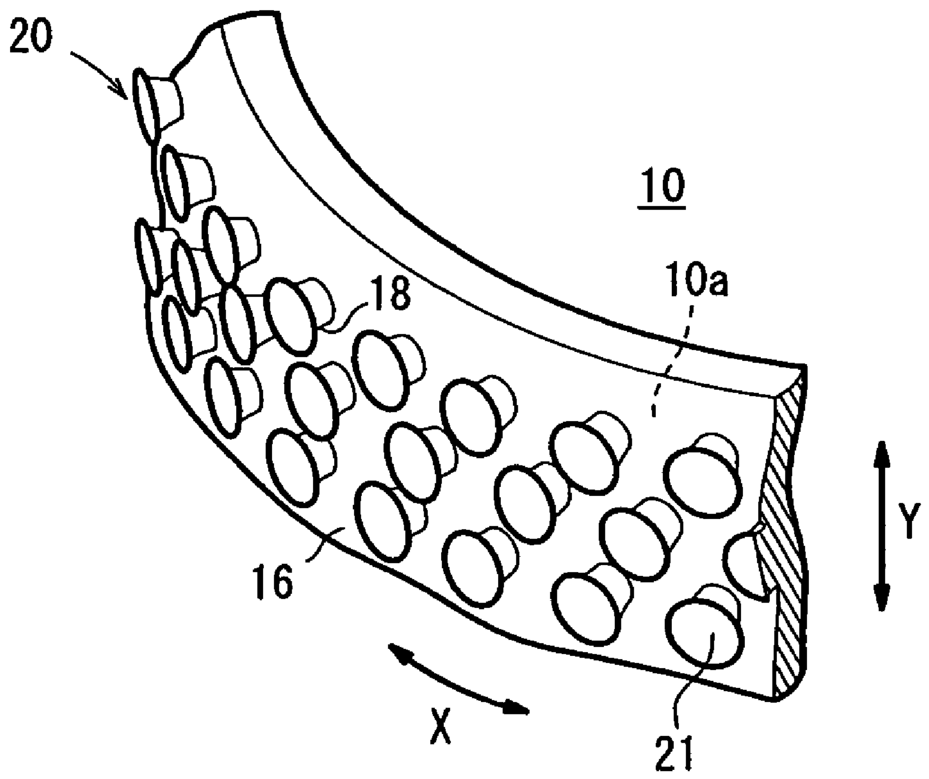
FIG. 2 is a fragmentary perspective view of the cylinder liner, the view showing protrusions on the cylinder liner.

Each of the cylinder liners 10 is molded of cast iron according to a centrifugal casting process. As shown in FIG. 2, the cylinder liner 10 has a plurality of protrusions 20 disposed on an outer circumferential surface 16 thereof over which the aluminum alloy is to be cast. Each of the protrusions 20 has a substantially conical undercut or neck 18 which is progressively spread outwardly and a flat outer face 21 on the distal end of the undercut or neck 18.

If the outer circumferential surface 16 of the cylinder liner 10 has a diameter ranging from 60 mm to 100 mm, then the height of each protrusion 20 from the outer circumferential surface 16 is in the range from 0.5 mm to 1.2 mm. The cylinder liner 10 has an inner surface **10*a* serving as a sliding surface against which a piston will slide back and forth. After the cylinder liner 10 has been cast to shape, the inner surface 10*a*** is machined.

Figure 3:
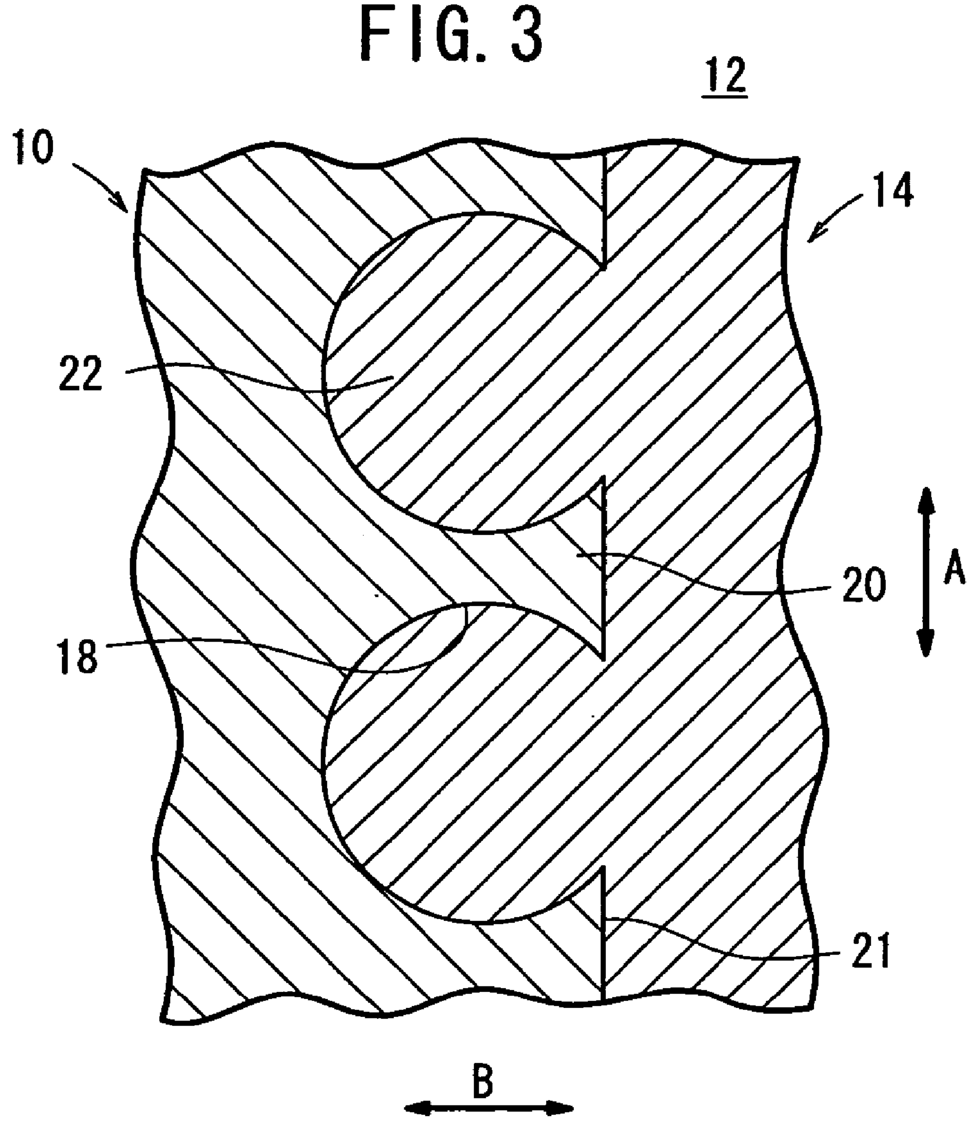
FIG. 3 is an enlarged fragmentary cross-sectional view of the cylinder block.

As shown in FIG. 3, when the block 14 of the cylinder block 12 is cast around the cylinder liner 10, the aluminum alloy of the block 14 fills up spaces between the protrusions 20 of the cylinder liner 10, thus forming spherical joints 22 on the block 14.

A process of manufacturing the cylinder liner (cast-iron insert) 10, i.e., a method of manufacturing the cast-iron insert according to the present invention, will be described below.

Figure 4:
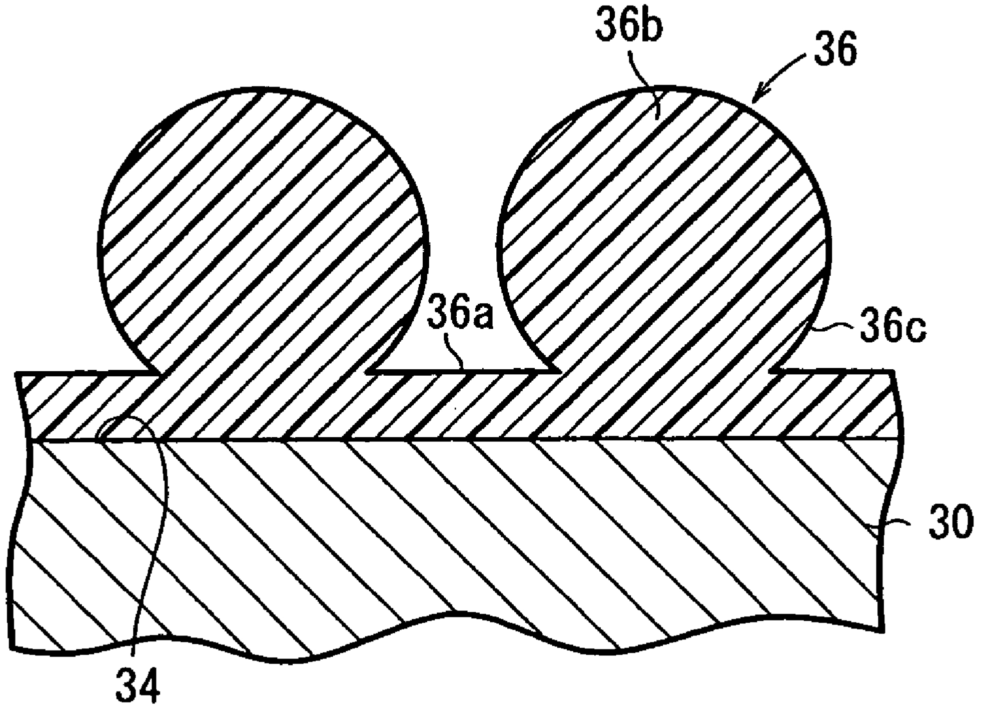
FIG. 4 is an enlarged fragmentary cross-sectional view illustrative of the manner in which a mold is coated with a facing material.

As shown in FIG. 4, a mold 30 of a centrifugal casting apparatus is of a cylindrical shape and is rotatably supported by an actuator (not shown).

While the mold 30 is being rotated at a mold G No. ranging from 25 G to 35 G, an inner circumferential surface 34 of the mold 30 is coated with a facing material 36. The facing material 36 contains a thermally insulating material, a binder, a parting agent, a surface active agent, and water. Specifically, the facing material 36 contains 20 weight % to 35 weight % of diatomaceous earth as the thermally insulating material, 1 weight % to 7 weight % of bentonite as the binder, 1 weight % to 5 weight % of the parting agent, 5 ppm to 50 ppm of the surface active agent, and the remainder of water.

The mold G No. is represented by (the centrifugal acceleration of the mold 30/the gravitational acceleration). If the mold G No. is expressed using the diameter D (cm) of the cylindrical mold 30 and the rotational speed N (rpm) of the mold 30, then the mold G No. is equal to $DN^2/17900$ (see Japanese laid-open patent publication No. 2002-283025 for details). Therefore, the mold G No. can be obtained from the diameter D and the rotational speed N.

When the inner circumferential surface 34 of the mold 30 is coated with the facing material 36, part of the facing material 36 swells outwardly from an outer facing material surface 36*a* under surface tension because of the surface active agent contained in the facing material 36, thus forming a number of spherical bulges 36*b* on the outer facing material surface 36*a*. Each of the bulges 36*b* has an undercut 36*c*.

Figure 5:
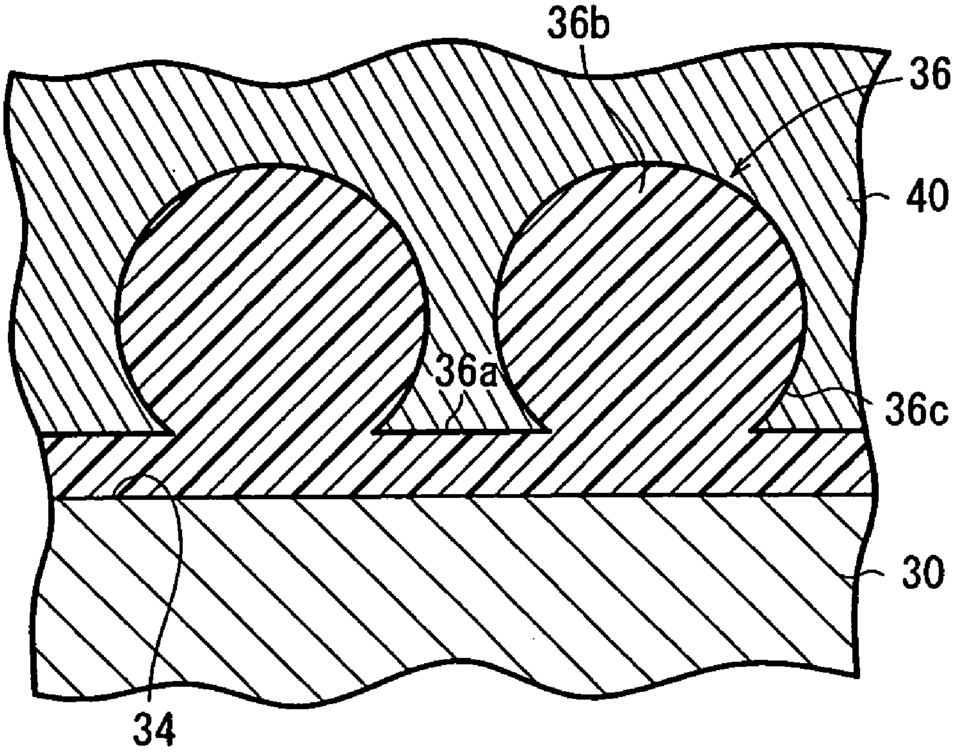
FIG. 5 is an enlarged fragmentary cross-sectional view illustrative of the manner in which a molten metal is poured into the mold.

Then, the atmosphere in the mold 30 is replaced with an inactive gas atmosphere containing an argon gas. Thereafter, as shown in FIG. 5, molten cast iron 40 is poured in the mold 30 while the mold 30 is being rotated at a mold G No. ranging from 100 G to 135 G.

The molten cast iron 40 fills the mold 30, covering the spherical bulges 36*b* of the facing material 36. When the molten cast iron 40 is subsequently cooled, the molded cast iron has a surface complementary to the outer facing material surface 36*a* and the spherical bulges 36*b* including the undercuts 36*c*. In this manner, the cylindrical cylinder liner 10 having the outer circumferential surface 16 with the protrusions 20 disposed thereon is formed in the mold 30.

In the present embodiment, the facing material 36 contains the thermally insulating material, the binder, the parting agent, the surface active agent, and the water. The thermally insulating material comprises diatomaceous earth and has a function to keep the molten cast iron 40 poured into the mold 30 at an optimum temperature. The diatomaceous earth is added in the range from 20 weight % to 35 weight %. If the diatomaceous earth were less than 20 weight %, then the facing material 36 would fail to be thermally insulative. If the diatomaceous earth were more than 35 weight %, then the facing material 36 would have an increased viscosity and would become less flowable than desired.

The binder has a function to keep the bulges 36*b* spherical in shape, and comprises bentonite, for example. The bentonite is added in the range from 1 weight % to 7 weight %. If the bentonite were less than 1 weight %, then the facing material 36 would lose its binding ability, allowing the other constituents thereof to separate. If the bentonite were more than 7 weight %, then the facing material 36 would become too viscous to disintegrate after the cylinder liner 10 has been cast to shape.

The parting agent is added in the range from 1 weight % to 5 weight %. If the parting agent were less than 1 weigh %, then the facing material 36 would lose its parting ability. If the parting agent were more than 5 weight %, then water contained in the parting agent would be turned into a gas due to the heat of the molten cast iron 40, producing blow holes in the cylinder liner 10.

The surface active agent has a function to increase the surface tension of the facing material 36 to keep the bulges 36*b* spherical in shape. The surface active agent is added in the range from 5 ppm to 50 ppm. If the surface active agent were less than 5 ppm, then it would fail to keep the bulges 36*b* spherical in shape. If the surface active agent were more than 50 ppm, then the facing material 36 would be foamed.

According to the present embodiment, after the inner circumferential surface 34 of the mold 30 has been coated with the facing material 36, the atmosphere in the mold 30 is replaced with an inactive gas atmosphere, and then the molten cast iron 40 is poured in the mold 30. Therefore, no oxide film is formed on the surface of the molten cast iron 40 as it is poured in the mold 30. As a result, the molten cast iron 40 has its fluidity kept well in the mold 30. Consequently, the molten cast iron 40 flows smoothly in the mold 30 and reliably fills the spaces around the spherical bulges 36*b* and the undercuts 36*c*. When the cast iron 40 is cooled into the cylinder liner 10, it has its surface shaped accurately complementarily to the surface configuration of the facing material 36.

The cylinder liner 10 has the protrusions 20, each with the substantially conical undercut or neck 18 progressively spread outwardly, firmly and neatly formed on the outer circumferential surface 16 thereof. The protrusions 20 are highly effective to keep the cylinder liner 10 in intimate contact with the block 14 cast therearound, and also make the cylinder liner 10 highly thermally conductive with respect to the block 14.

Figure 6:
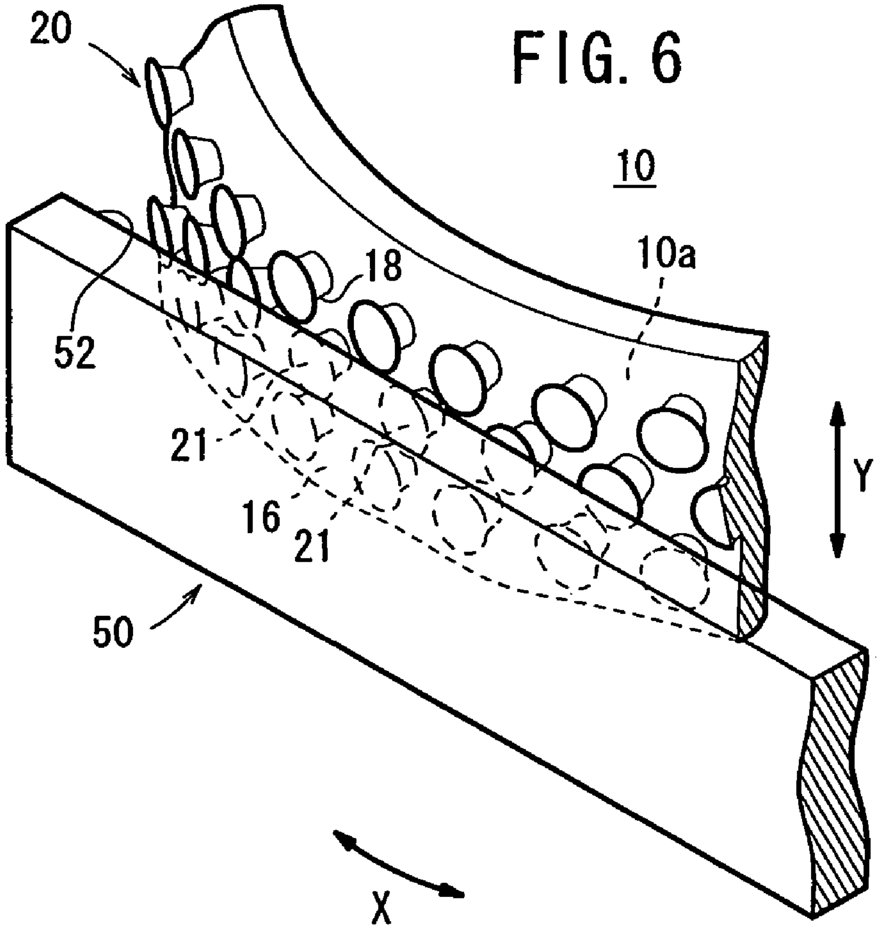
FIG. 6 is a fragmentary perspective view illustrative of the manner in which the cylinder liner is positioned by a clamp mechanism.

As shown in FIG. 6, the cylinder liner 10 which has been cast to shape is positioned and held by a clamp mechanism 50, and the inner surface 10*a* thereof is machined by a machine tool, not shown. While the inner surface 10*a* of the cylinder liner 10 is being machined, the clamp mechanism 50 has a clamping surface 52 held in face-to-face contact with some of the flat faces 21 of the protrusions 20 of the cylinder liner 10.

Figure 9:
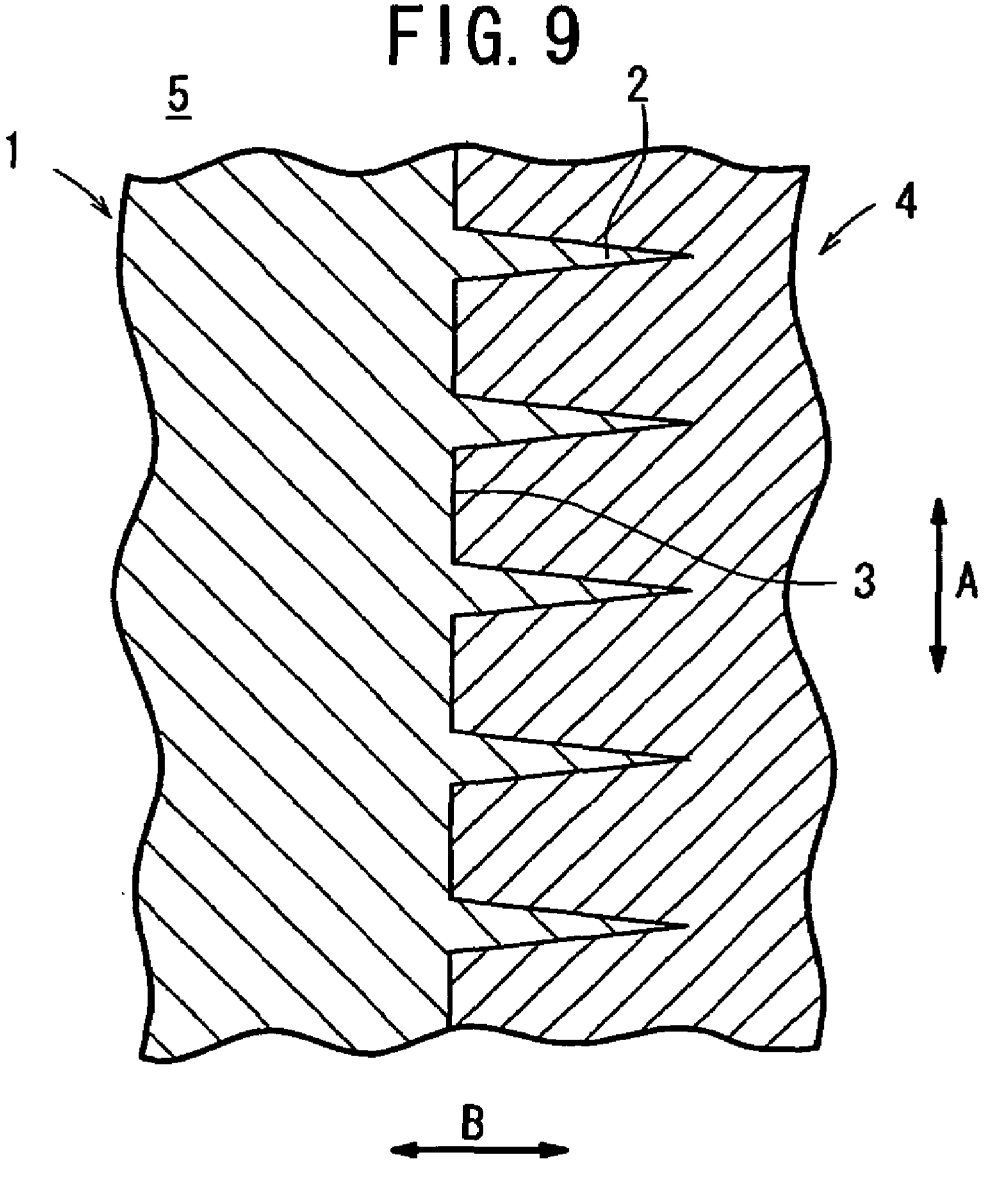
FIG. 9 is an enlarged fragmentary cross-sectional view of a conventional insert.

Since the clamping surface 52*a* of the clamp mechanism 50 holds the cylinder liner 10 in face-to-face contact therewith, it provides a much greater area of contact with the cylinder liner 10 than it would otherwise hold the cylinder liner 10 in point-to-point contact with the conventional spines 2 (see FIG. 9). Accordingly, the clamp mechanism 50 can clamp the cylinder liner 10 securely and accurately in position, allowing the inner surface 10*a* thereof to be machined accurately.

After the cylinder liner 10 has been machined on the inner surface 10*a* thereof and otherwise machined, the cylinder liner 10 is placed in a cylinder block casting mold, not shown. Then, another metal such as an aluminum alloy, for example, is poured into the cylinder block casting mold, casting the block 14 around the cylinder liner 10. In this manner, the cylinder block 12 is manufactured.

According to the present embodiment, as shown in FIG. 2, the undercuts or necks 18 of the protrusions 20 are substantially conical in shape and are so shaped in both the circumferential direction (indicated by the arrow X) of the cylinder liner 10 and the axial direction (indicated by the arrow Y) of the cylinder liner 10. Therefore, as shown in FIG. 3, the protrusions 20 of the cylinder liner 10 and the spherical joints 22 on the block 14 are held in intimate contact with each other.

The cylinder liner 10 and the block 14 are prevented from being displaced or shifted in the directions indicated by the arrow A, so that residual stresses produced in inter-bore regions 15 (see FIG. 1) of the cylinder block 12 can be reduced. The cylinder liner 10 and the block 14 are also prevented from peeling off each other in the directions indicated by the arrow B, so that the strength of intimate adhesion between the cylinder liner 10 and the block 14 is prevented from being reduced.

Furthermore, the cylinder liner 10 and the block 14 are held in intimate contact with each other through a large surface area. Accordingly, the heat generated in the cylinder liner 10 when the piston slides back and forth against the cylinder liner 10 can efficiently be transmitted to the block 14, so that the cylinder block 12 has a high heat radiation capability.

Figure 7:
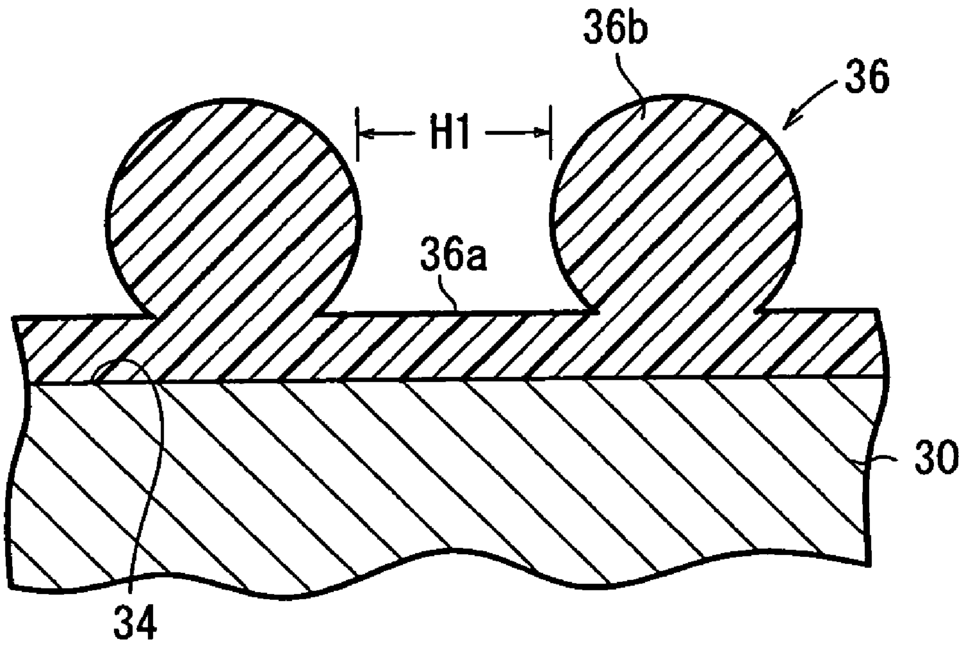
FIG. 7 is an enlarged fragmentary cross-sectional view of a facing material applied at a low mold G No.

The mold G No. of the mold 30 is selected in the range from 25 G to 35 G when the facing material 36 is applied to the mold 30. If the mold G No. were less than 25 G, then, as shown in FIG. 7, the spherical bulges **36*b* would not be deformed sufficiently, resulting in an unduly wide interval H1 between adjacent ones of the spherical bulges 36*b*. The unduly widely spaced spherical bulges 36*b* would fail to give desired undercuts 18 to the protrusions 20 of the cylinder liner 10, which would then not be able to adhere firmly to the block 14**.

Figure 8:
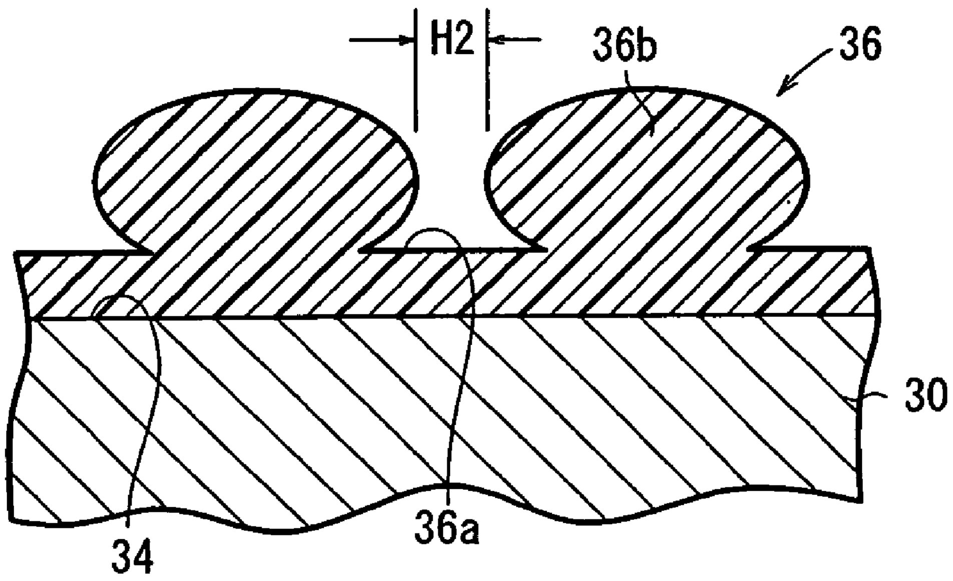
FIG. 8 is an enlarged fragmentary cross-sectional view of a facing material applied at a high mold G No.

If the mold G No. were more than 35 G, then, as shown in FIG. 8, the spherical bulges **36*b* would be deformed excessively, resulting in an unduly narrow interval H2 between adjacent ones of the spherical bulges 36*b*. The unduly narrowly spaced spherical bulges 36*b* would reduce the diameter of the necks 18 of the protrusions 20 of the cylinder liner 10**, which would then be liable to be broken off.

In the present embodiment, the height of each protrusion 20 from the outer circumferential surface 16 is in the range from 0.5 mm to 1.2 mm. If the height of each protrusion 20 were less than 0.5 mm, then it would be difficult to produce the undercuts or necks 18 of desired shape, which would then not be able to adhere firmly to the block 14. If the height of each protrusion 20 were more than 1.2 mm, then the necks 18 of the protrusions 20 would undesirably be elongated and might possibly be broken off.

In the present embodiment, the cylinder liner 10 has been described as a cast-iron insert according to the present invention. However, the present invention is also applicable to a brake shoe for brake drums, for example, as a cast-iron insert.

If a brake shoe has an outer dimension of about 130 mm, then protrusions on the brake shoe should preferably have a height in the range from 0.5 mm to 2 mm.

INDUSTRIAL APPLICABILITY

According to the present invention, a cast-iron insert has a plurality of protrusions disposed on the surface. The protrusions have respective substantially conical undercuts or necks which are progressively spread outwardly from the surface in various different directions. The substantially conical undercuts allow the cast-iron insert and the other metal, e.g., an aluminum alloy, cast therearound to be held in intimate contact with each other. The protrusions have a much larger surface area than the conventional spines. When the cast-iron insert is actually used, the heat generated in the cast-iron insert can well be transmitted to the aluminum alloy. Accordingly, the cast-iron insert has a high heat radiation capability.

The protrusions have respective flat faces on the distal ends of the undercuts or necks which are progressively spread outwardly from the surface of the cast-iron insert. Consequently, the area of contact between the outer circumferential surface of the cast-iron insert and the clamping surface of a clamp mechanism which clamps the cast-iron insert in position is much larger than the area of contact between the outer circumferential surface of the conventional spikes and the clamping surface. As a result, the cast-iron insert can be clamped in position with increased accuracy and hence can be machined neatly with increased accuracy.

According to the present invention, a cast-iron insert is manufactured so that the protrusions are firmly formed on the surface of the cast-iron insert by a simple process. Each of the protrusions has a substantially conical undercut or neck, and the undercut has a spherical contact portion. The protrusions are highly effective to keep the cast-iron insert in intimate contact with the aluminum alloy or the like cast therearound, and also make the cast-iron insert highly thermally conductive with respect to the aluminum alloy or the like.

The invention claimed is:

1. A cast-iron insert around which another metal is to be cast, comprising:

a surface for contact with a molten mass of said other metal to be cast around the cast-iron insert; and a plurality of protrusions disposed on said surface and having respective substantially conical undercuts which are progressively spread outwardly from said surface, wherein distal ends of said protrusions have respective flat faces, the flat faces allowing the cast-iron insert to be securely held in face-to-face contact by a clamping mechanism, wherein said undercuts have respective spherical contact portions, and said other metal is cast around said spherical contact portions, and wherein said cast-iron insert comprises a cylinder liner.

2. The cast-iron insert around which another metal is to be cast according to claim 1, wherein the protrusions have a height in a range of 0.5 mm to 2 mm above the surface for contact.

3. The cast-iron insert around which another metal is to be cast according to claim 1, wherein the protrusions have a height in a range of 0.5 mm to 1.2 mm above the surface for contact.

4. The cast-iron insert around which another metal is to be cast according to claim 1, wherein the surface of contact has a diameter ranging from 60 mm to 100 mm.

5. A method of manufacturing a cast-iron insert, comprising the steps of:

coating an inner surface of a mold with a facing material containing a thermally insulating material, a binder, a parting agent, a surface active agent, and water;

replacing an existing atmosphere in said mold with an inactive gas atmosphere;

rotating said mold which has been coated with said facing material and simultaneously pouring molten cast iron into said mold, to produce a cast-iron insert having a surface for contact with a molten mass of another metal to be cast around the cast-iron insert, and a plurality of protrusions disposed on said surface and having respective substantially conical undercuts which are progressively spread outwardly from said surface; and positioning a clamping mechanism against respective flat faces formed at distal ends of said protrusions in order to securely hold the cast-iron insert, wherein said undercuts have respective spherical contact portions, and said other metal is cast around said spherical contact portions, and wherein said facing material contains 20 weight % to 35 weight % of diatomaceous earth as said thermally insulating material, 1 weight % to 7 weight % of bentonite as said binder, 1 weight % to 5 weight % of said parting agent, 5 ppm to 50 ppm of said surface active agent, and the remainder of water.

6. The method according to claim 5, wherein said mold is rotated at a mold G No. ranging from 25 G to 35 G when the inner surface of the mold is coated with the facing material.

7. The method according to claim 5, further comprising the step of machining an inner surface of the cast-iron insert after performing the step of positioning the clamping mechanism against the respective flat faces at distal ends of said protrusions in order to securely hold the cast-iron insert.

8. The method according to claim 5, wherein the protrusions have a height in a range of 0.5 mm to 2 mm above the surface for contact.

9. The method according to claim 5, wherein the protrusions have a height in a range of 0.5 mm to 1.2 mm above the surface for contact.

10. The method according to claim 5, wherein the surface of contact has a diameter ranging from 60 mm to 100 mm.

* * * * *